June 4, 1929. L. A. PARADISE 1,715,779
HITCH DEVICE
Filed Feb. 15, 1926
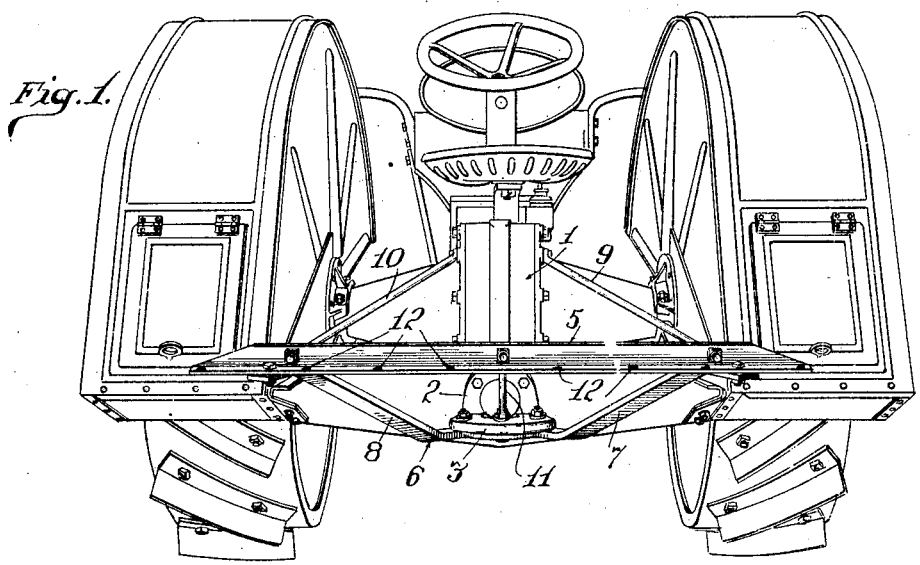
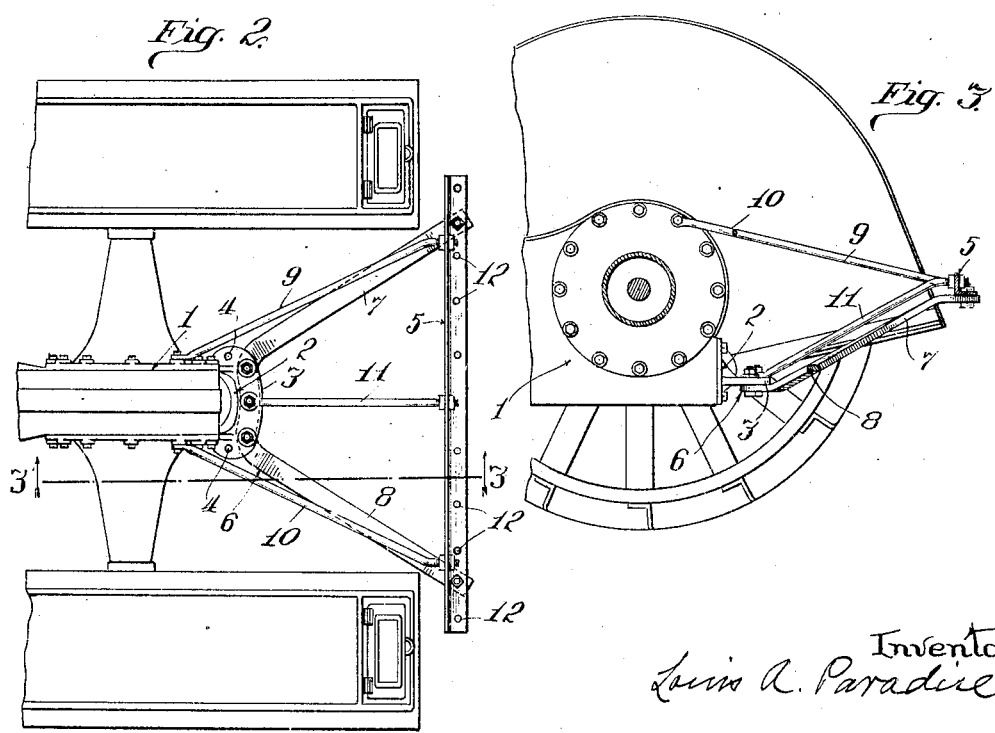
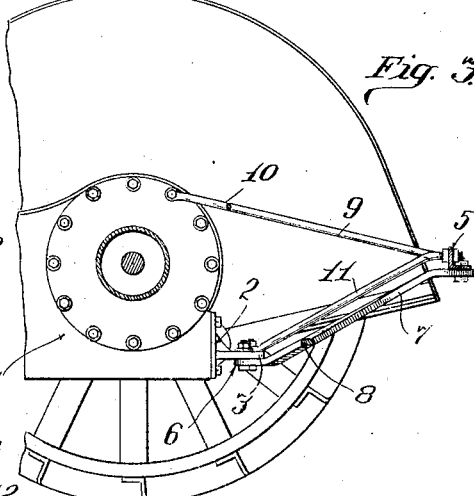

Patented June 4, 1929.

1,715,779

UNITED STATES PATENT OFFICE.

LOUIS A. PARADISE, OF MOLINE, ILLINOIS, ASSIGNOR TO DEERE & COMPANY, OF MOLINE, ILLINOIS, A CORPORATION OF ILLINOIS.

HITCH DEVICE.

Application filed February 15, 1926. Serial No. 88,212.

My invention relates to hitch devices, and more particularly to that form especially applicable to a certain type of tractor and to which any of various agricultural machines, and other bodies to be tractor drawn, can be readily attached, and an object of my invention is to provide a device of this character having its drawbar located rearwardly of the tractor so as to permit a greater lateral swing of the object attached and reduce to a minimum the possibility of contact with either side of the rear of the tractor during a turn of the latter from a straight course of travel, and to brace and support the device in a manner whereby the strains incident to its operation are effectively withstood. Other objects will be apparent in the following specification:

Refering to the drawings in which similar numerals indicate identical parts:

Figure 1 is a rear view of a tractor with my device attached;

Figure 2 is a plan view of the rear part of a tractor and of my device attached thereto, and Figure 3 is a section on the line 3—3 of Figure 2.

To the rear of the gear casing 1, through which the axle of a tractor of this type extends, and adjacent the bottom thereof is rigidly bolted a bracket 2 having a rearwardly extending horizontal hitch plate 3 provided with a series of holes 4 ordinarily utilized for the purpose of attaching to the hitch plate an object to be drawn by the tractor. A drawbar 5, made preferably of angle iron and of the required length, is located rearwardly of the tractor the necessary distance to have a sufficient clearance therefrom, and is supported and braced in the following manner; a V-shaped support and brace 6 has its apex spread laterally to substantially the width of the hitch plate 3 to which it is rigidly secured by a plurality of bolts through holes 4, and its arms 7 and 8 diverge upwardly and rearwardly to the drawbar 5 to which the ends of said arms are rigidly bolted.

Secured to the gear casing, adjacent the top thereof and above the plane of the axle, is a rod 9 extending downwardly, outwardly and rearwardly to the drawbar 5 to which its rear end is rigidly attached adjacent the attachment of the arm 7 thereto; a similar rod 10 is bolted to the gear casing and extends in a like manner to the drawbar 5 where its end is attached to the bar 5 adjacent the end of the arm 8. On the central longitudinal line of the tractor is a rod 11 having one end bolted to the hitch plate 3 from which it extends upwardly and rearwardly to the bar 5 and to which it is rigidly bolted intermediate the ends thereof.

I provide a series of holes 12 in the drawbar 5 so that one or more can be utilized to secure any machine or other object to the drawbar and position it at various points to either side of the longitudinal central line of the tractor or directly in that line. The drawbar 5 is approximately the height of the axle above the ground and is of a desired length to provide a wide range of attachment, for objects to be drawn by the tractor, a sufficient number of holes being provided in the drawbar for that purpose. I find that by positioning the drawbar at the height shown, it accommodates a greater variety of implements and other objects, and at the same time permits of a better system of bracing supports than would otherwise be possible, and by locating the drawbar to the rear of the body limits of the tractor, the possibility of contact with the tractor by a machine or other body drawn thereby, when making a turn, is practically eliminated.

As previously stated, the arms 7 and 8 of the brace support 6 extend upwardly, rearwardly and outwardly, and the rods 9 and 10 extend downwardly, rearwardly and outwardly, and on the widely spaced extremities of the arms and rods, the drawbar 5 is rigidly secured and supported; by this construction, the arms and rods are in complete cooperation to withstand any vertical or lateral strain from a body attached to the drawbar, and the strength of the construction is materially increased by the rod 11 which, from its attachment to the hitch plate 3, extends upwardly and rearwardly on the longitudinal central line of the tractor, to rigid connection with the drawbar 5.

What I claim is—

1. The combination with a tractor having a rear axle and a gear casing thereon, of a hitch plate mounted on said casing, a drawbar positioned transversely of the rear of the tractor, lower supports for the drawbar rigidly attached to the hitch plate and extending rearwardly, outwardly and upwardly having their rear ends widely spaced apart and secured to the drawbar, similar supports secured to the upper part of the casing and extending rearwardly, downwardly and outwardly therefrom to the drawbar and rigidly secured thereto adjacent the ends of the lower supports, and a brace attached to the hitch plate extending rearwardly and upwardly on the central longitudinal line of the tractor and secured to said drawbar.

2. The combination with a tractor having a rear axle and a gear casing thereon, of a hitch plate mounted on said casing, a drawbar positioned transversely of the rear of the tractor, a lower V-shaped support for the drawbar having its apex spread laterally to substantially the width of the hitch plate and rigidly secured thereto, the arms of said support extending rearwardly, outwardly and upwardly, their rear ends spaced apart and rigidly secured to the drawbar, similar supports secured to the upper part of the casing and extending rearwardly, downwardly and outwardly therefrom to the drawbar and rigidly secured to the drawbar adjacent the arms of the lower support, and a brace attached to the hitch plate extending rearwardly and upwardly on the central longitudinal line of the tractor and secured to said drawbar.

LOUIS A. PARADISE.